(12) United States Patent
Short et al.

(10) Patent No.: US 6,868,399 B1
(45) Date of Patent: Mar. 15, 2005

(54) SYSTEMS AND METHODS FOR INTEGRATING A NETWORK GATEWAY DEVICE WITH MANAGEMENT SYSTEMS

(75) Inventors: Joel E. Short, Los Angeles, CA (US); Denis I. Perelyubskiy, Van Nuys, CA (US)

(73) Assignee: Nomadix, Inc., Westlake Village, CA (US)

( * ) Notice: Subject to any disclaimer, the term of this patent is extended or adjusted under 35 U.S.C. 154(b) by 427 days.

(21) Appl. No.: 09/693,061

(22) Filed: Oct. 20, 2000

Related U.S. Application Data (60) Provisional application No. 60/160,973, filed on Oct. 22, 1999, provisional application No. 60/161,182, filed on Oct. 22, 1999, provisional application No. 60/161,139, filed on Oct. 22, 1999, provisional application No. 60/161,189, filed on Oct. 22, 1999, provisional application No. 60/161,181, filed on Oct. 22, 1999, and provisional application No. 60/161,093, filed on Oct. 22, 1999.

(51) Int. Cl.[7] ............................................. G06F 17/60
(52) U.S. Cl. ....................................... 705/34; 709/224
(58) Field of Search ............................ 705/34; 709/224

(56) References Cited

U.S. PATENT DOCUMENTS

| | | | |
|---|---|---|---|
| 5,612,730 A | | 3/1997 | Lewis |
| 5,745,884 A | * | 4/1998 | Carnegie et al. ............... 705/34 |
| 5,802,502 A | * | 9/1998 | Gell et al. ..................... 705/34 |
| 5,852,812 A | * | 12/1998 | Reeder ......................... 705/34 |

(List continued on next page.)

FOREIGN PATENT DOCUMENTS

| | | | | |
|---|---|---|---|---|
| EP | 0 762 707 A2 | | 3/1997 | |
| JP | 2000-354127 A | * | 12/2000 | ............ H04N/1/00 |
| JP | 2002-111870 A | * | 4/2002 | ............ H04M/3/42 |
| WO | WO 98/16044 | | 4/1998 | |

OTHER PUBLICATIONS

"Atreus Systems Corporations and B2B Connect, Inc. Partner to Deliver Bundled Broadband Services to Multi-Tenant, High Ri Buildings", Feb. 14, 2000, Business Wire.*

"NetGame Ltd. Announces its High-Speed, In-Room Hotel Internet Access Product to be Displayed at HITEC 99", Jun. 16, 1999, Business Wire.*

"Copper Mountain Introduces CopperPowered Hotel Initiative to Deliver Cost-effective Always-on or Usage-based Broadband Access to Hotel Guests", Dec. 6, 1999, Business Wire.*

"Nomadix Joins Copper Mountain Networks to Provide High-Speed Internet Access to Hotels Guests", Dec. 6, 1999, Business Wire.*

(List continued on next page.)

*Primary Examiner*—Bryan J Jaketic
(74) *Attorney, Agent, or Firm*—Alston & Bird LLP (57) ABSTRACT

Systems and methods enabling a management system to communicate with a network gateway device to automatically manage a user accessing a computer network, such as a local network. The system includes a computer, and a network gateway device in communication with the computer for connecting the computer to a computer network, wherein the network gateway device maintains data representative of the user's access to the computer network and wherein the network gateway device reconfigures the data. The system also includes a management system connected to said network gateway device for automatically billing the user based upon usage of the computer network, wherein the management system is configured to communicate according to at least one compatible protocol. The network gateway device reconfigures the data to meet one of the predetermined protocols supported by the management system, and the management system receives the data reconfigured by the network gateway device and utilizes the data reconfigured by the network gateway device for automatic billing purposes.

21 Claims, 3 Drawing Sheets

U.S. PATENT DOCUMENTS

| | | | |
|---|---|---|---|
| 5,864,610 A | | 1/1999 | Ronen |
| 5,893,077 A | * | 4/1999 | Griffin .................... 705/34 |
| 5,950,195 A | | 9/1999 | Stockwell et al. |
| 5,987,430 A | * | 11/1999 | Van Horne et al. ........... 705/34 |
| 6,119,160 A | * | 9/2000 | Zhang et al. ............... 709/224 |
| 6,208,977 B1 | * | 3/2001 | Hernandez et al. ........... 705/34 |
| 6,338,046 B1 | * | 1/2002 | Saari et al. ................... 705/34 |
| 6,349,289 B1 | * | 2/2002 | Peterson et al. .............. 705/34 |
| 6,496,850 B1 | * | 12/2002 | Bowman-Amuah ......... 709/224 |

OTHER PUBLICATIONS

"Ascend Communications and ATCOM/INFO Announce Development Alliance", Jun. 22, 1999, Business Wire.*

Schoen et al., *Convergence Between Public Switching and the Internet*, published Sep. 21, 1997 in *XVI World Telecom Congress Proceedings*, pp. 549–560.

* cited by examiner

SYSTEMS AND METHODS FOR INTEGRATING A NETWORK GATEWAY DEVICE WITH MANAGEMENT SYSTEMS

CROSS-REFERENCE TO RELATED APPLICATIONS

The present invention claims priority from U.S. Provisional Application Ser. No. 60/160,973, filed Oct. 22, 1999, titled "Systems and Methods for Enabling Network Gateway Devices to Communicate with Management Systems to Facilitate Subscriber Management," U.S. Provisional Application Ser. No. 60/161,182, filed Oct. 22, 1999, entitled "Systems and Methods for Dynamic Bandwidth Management on a Per Subscriber Basis in a Computer Network," U.S. Provisional Application Ser. No. 60/161,139, filed Oct. 22, 1999, titled "Information And Control Console For Use With A Network Gateway Interface," U.S. Provisional Application Ser. No. 60/161,189, filed Oct. 22, 1999, titled "Systems and Methods for Transparent Computer Access and Communication with a Service Provider Network Using a Network Gateway Device," U.S. Provisional Application Ser. No. 60/161,181, filed Oct. 22, 1999, titled "Gateway Device Having an XML Interface and Associated Method," and U.S. Provisional Application Ser. No. 60/161,093, filed Oct. 22, 1999, titled "Location-Based Identification and Authorization for use With a Gateway Device," the contents of each of which are incorporated herein by reference.

FIELD OF THE INVENTION

The present invention relates generally to a network gateway device and, more particularly, to systems and methods for integrating one or more gateway devices with management systems.

BACKGROUND OF THE INVENTION

Through gateway devices or routers Internet Service Providers (ISPs) or enterprise network (such as a LANS) providers can permit a wide variety of users access to their networks and to other online services. Because high speed access to enterprise networks, the Internet and on-line services is a desirable commodity, like long distance telephone service, costs associated with the service are typically passed on to the remote user/subscriber. Therefore, in many instances the remote user/subscriber is concerned with being able to acquire network access and service in the most cost efficient and convenient manner.

In this regard, service concerns of subscribers accessing local networks through gateway devices parallel those concerns of customers utilizing internet service providers for conventional telephone line dial-up Internet access. In both cases, users typically want inexpensive, flexible and customer friendly service options. Correspondingly, a gateway device administrator desires the capability to be able to offer the user/subscriber numerous and different service and billing rate options, like those available in conventional dial-up internet access. For example, the remote user in a hotel environment may desire a subscription for only a day, or for the duration of their stay at the hotel. The user/subscriber may be charged on an hourly rate, a daily rate, a weekly rate, or at any other interval. Such flexible plans offer cost savings to consumers and are an attractive incentive to lure customers into buying access time to the enterprise network, online services or the internet.

Unlike conventional dial-up internet access, however, gateway devices permit remote users to access various computer networks and on-line services without having a prior service contract or an ongoing relationship with the service provider. Therefore, unlike conventional dial up access plans, which can bill subscribers on a set monthly schedule, gateway devices make recouping remote access charges more challenging. This is especially true for nomadic users, who may utilize a remote connection to a network only once before relocating. Once the traveler has moved onward, the network provider may have difficulty in collecting any unpaid service charges. Furthermore, billing of nomadic users is another hurdle to fast and easy access to the enterprise network, on-line services and the internet. The benefits of remote plug and play access therefore may be overshadowed by time consuming payment methods. For example, where a user is required to complete an onerous billing procedure to pre-purchase local network time or to pay for the network use after each session, the user may decide not to use the network. Thus, any convenience provided by the computer network is superceded by the inconvenient billing method.

Gateway device administrators also desire convenient methods in which to bill users/subscribers. Because the gateway device enables subscribers immediate plug and play connections to computer networks, such as hotel or airport networks, the computer network provider and/or service provider of the high speed network would like to quickly and immediately bill the users/subscribers. This billing should be able to easily track a user/subscriber's usage of the network so as to recoup costs for the network hardware and network connection. Furthermore, such billing should be automated such that system administrators do not need to individually bill each user.

Therefore, it is desirable for customers, network providers and service providers to implement automatic billing through a gateway device utilizing a management system already used for billing customers. Such automatic billing utilizing the present invention to automatically send a billing record to a management system would benefit customers by facilitating fast and easy access, and also would benefit network providers who could appropriately charge customers for obtaining network or Internet access.

SUMMARY OF THE INVENTION

The present invention relates generally to a network gateway device and, more particularly, to network gateway devices communicating with management systems or servers, such as hotel property management systems, to facilitate subscriber management and billing.

According to one embodiment of the invention, there is provided a system for enabling a management system to communicate with a network gateway device in order to automatically bill a user for access to a computer network such as a local network or the Internet. The system includes a computer, and a network gateway device in communication with the computer for connecting the computer to a computer network and for maintaining data representative of the user's access to the computer network. The system also includes a management system connected to the network gateway device that is designed to automatically bill the user for network or Internet access, or services facilitated by the network access, such as room service, business services, and the like. The management system is also designed to communicate with a third party device according to at least one predetermined protocol. According to the present invention, the gateway device is therefore designed to supply billing data using one of the predetermined protocols supported by the management system. As such, the management system receives the billing data supplied by the network gateway device and utilizes the data for automatic billing purposes.

Furthermore, in the system for enabling a management system to communicate with a network gateway device to bill a user for access to a computer network, the management system can be located within the computer network. Additionally, the system can include a translator in communication with the gateway device and management system for receiving the data supplied by the network gateway device. The translator can further reconfigure the supplied billing data received from the network gateway device, and can transmit the further reconfigured data to the management system. The data representative of the user's access to the computer network can include data representative of the user's location, access time, date which access was obtained, billing rate, and other pertinent information.

According to another embodiment of the invention, a method for enabling a remote server, such as an Internet website, to communicate with a network gateway device in order to automatically bill a customer via the management system such as a hotel's Property Management System.

According to yet another embodiment of the present invention, there is disclosed a system for integrating a gateway device with a management system, wherein the management system can activate communication with the gateway device. The system includes a computer, and a network gateway device in communication with said computer for connecting the computer to the computer network, wherein the network gateway device maintains data representative of the user's access to the computer network. The system further includes a management system connected to said network gateway device, wherein the management system receives the data representative of the user's access to the computer network, and wherein the management system initiates communication with the gateway device to manage the computer network.

According to one aspect of the invention, the management system communicates with the network gateway device in at least one predetermined protocol selected from the group consisting of a low level protocol, a call accounting record, and a private branch telephone system protocol. According to another aspect of the invention, the management system is a hotel property management system.

The ability to bill customers for service automatically and track customers without administrator intervention allows the local network service provisioning to be done economically, efficiently, and securely, as no administrator intervention is required. That is, the gateway device generates accounting records that are formatted and forwarded to the PMS to facilitate automatic billing. This automatic billing generates a bill that can be paid by a customer electronically (e.g., via the Internet), or at checkout of the hotel. Alternatively, a customer may have pre-purchased network access.

The present invention provides an: incentive for hotels, airports, and other computer networks to provide network connections to users because the computer network has a captive customer base. Furthermore, automatic billing can enable usage-based billing for network access and services, which is desirable to customers. Finally, automatic billing can reduce the risk of network use by an unauthorized user.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
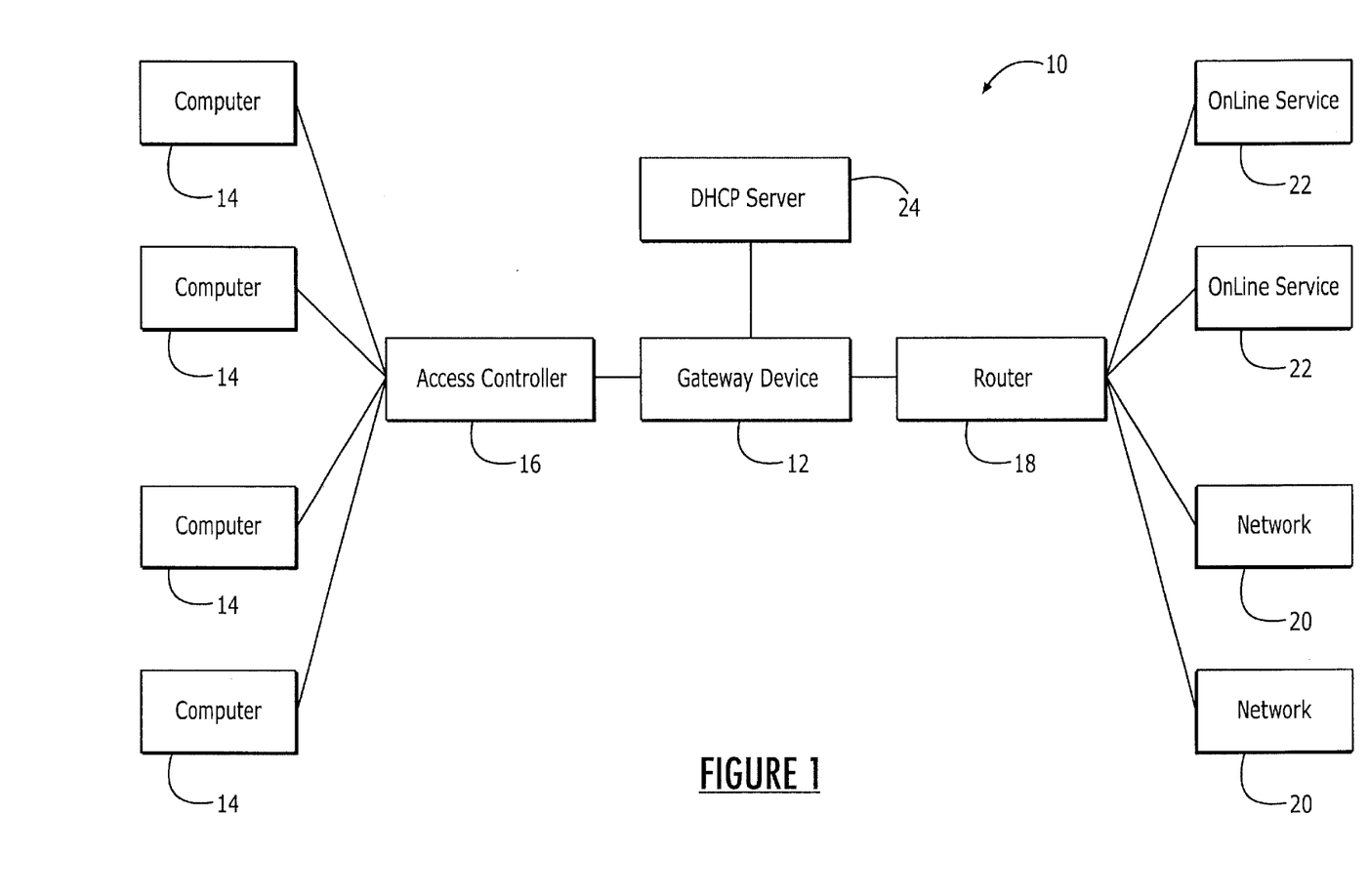
FIG. 1 is a block diagram of a computer system including a gateway device facilitating communication between computers and networks or other online services, according to one embodiment of the invention.

Referring now to FIG. 1, there is shown in block diagram form a computer system 10 including a plurality of computers 14 that can communicate with one or more online services 22 or networks via a gateway device 12 providing the interface between the computers 14 and the various networks 20 or online services 22. One embodiment of such a gateway device has been described in U.S. patent application Ser. No. 08/816,174 and U.S. Provisional Application No. 60/111,497 (collectively referred to herein as the Gateway Device Applications), the contents of which are incorporated herein by reference. Briefly, the gateway device 12 facilitates transparent computer access to the online services 22 or networks 20, such that the computers 14 can access any networks via the device 12 regardless of their network configurations. Additionally, the gateway device 12 includes the ability to recognize computers attempting to access a network 20, the location of computers attempting to access a network, the identity of users attempting to gain network access, and additional attributes, as is discussed in the Gateway Device Applications.

As illustrated in FIG. 1, the computer system 10 also includes an access concentrator 16 positioned between the computers 14 and the gateway device 12 for multiplexing the signals received from the plurality of computers onto a link to the gateway device 12. Depending upon the medium by which the computers 14 are connected to the access concentrator, the access concentrator 16 can be configured in different manners. For example, the access concentrator can be a digital subscriber line access multiplexer (DSLAM) for signals transmitted via regular telephone lines, a cable head end (a Cable Modem Termination Shelf (CMTS)) for signals transmitted via coaxial cables, a wireless access point (WAP) for signals transmitted via a wireless network, an Ethernet switch or the like.

The computer system 10 further includes one or more routers 18 and/or servers (not shown in FIG. 1) to control or direct traffic to and from a plurality of computer networks 20 or other online services 22. While the computer system 10 is depicted to have a single router, the computer system 10 can have a plurality of routers, switches, bridges, or the like that are arranged in some hierarchical fashion in order to appropriately route traffic to and from the various networks 20 or online services 22. In this regard, the gateway device 12 typically establishes a link with one or more routers. The routers, in turn, establish links with the servers of the networks 20 or online services 22, based upon the user's selection. It will be appreciated by one of ordinary skill in the art that one or more devices illustrated in FIG. 1 may be combinable. For example, although not shown, the router 18 may be located entirely within the gateway device 12. Furthermore, additional elements may be included in the computer system 10, such as elements disclosed in the Gateway Device Application, or network elements known to those of ordinary skill in the art.

Figure 2:
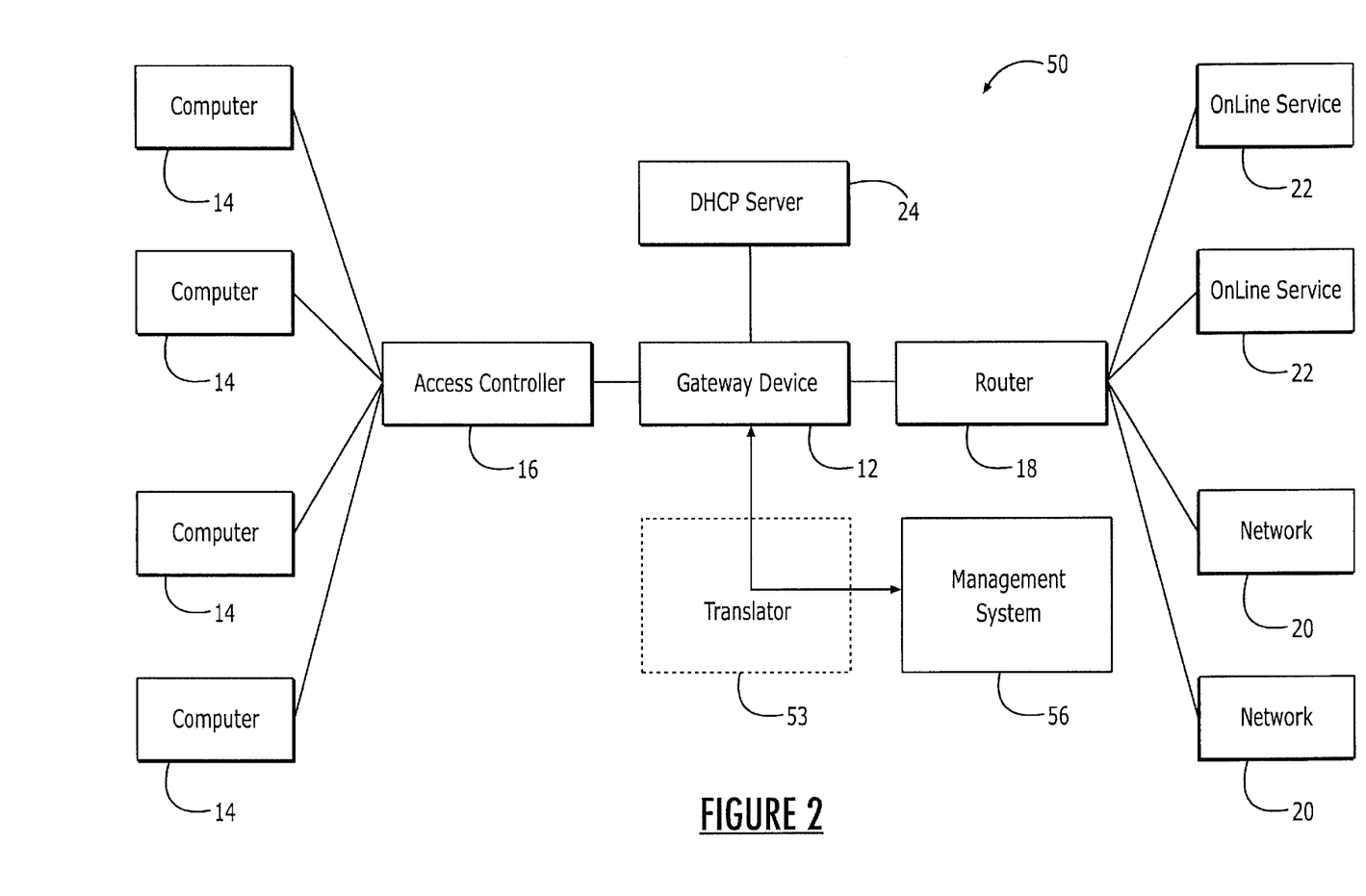
FIG. 2 shows a block diagram of the computer system of FIG. 1, including a gateway device integrated with a management system, according to one aspect of the invention.

FIG. 2 shows a block diagram of the computer system 50 of FIG. 1, integrated with a management system 56, according to one embodiment of the present invention. It will be appreciated by those of skill in the art that the embodiment shown in FIG. 2 is for illustrative purposes, and that the gateway device 12 may be integrated with virtually any network server or management system, such as computer networks used in corporate offices, airports, arenas, apartment complexes, office buildings or the like. As a result, the embodiment shown in FIG. 2 is for illustrative purposes only, and is not intended to limit the scope of the present invention.

According to one aspect of the invention, the gateway device 12 is in direct communication with the management system 56 through a serial connection 57. Optionally, the gateway device 12 may be connected to the management system 56 through a translator 53, illustrated with phantom lines to indicate that the translator 53 is not a required component of the management system 56, as is explained in detail below. Because the gateway device 12 comprises similar components to the system illustrated in FIG. 1, it will be appreciated that the systems can be implemented in like manners with like components. Furthermore, additional embodiments of the present invention discussed with respect to FIG. 1 and in the Gateway Device Applications may also be implemented in the system 56 shown in FIG. 2.

As shown in FIG. 2, each of the plurality of computers 14 is located in a different hotel room 60, 70, 80 and 90 to allow multiple guests to access the hotel's computer network. The computers 14 are connected to the access controller 16 through a communications port in each room using a communications device such as a DSL modem, an Ethernet card, a coaxial cable, or another well known communication device. Most preferably, the connection between the computers 14 and the access controller 16 is a high speed connection, so that the computers 14 can receive data as fast as the gateway device 12 can forward the data. The data transmitted from the gateway device 12 to the computers 14 may originate from any devices located within the computer system 50, such as communications via the Internet.

Management systems 56 are typically implemented through the use of one or more conventional computers. It will be appreciated that management systems 56 may include any well known computer based systems implemented in hotels, airports, arenas or other venues to manage operations or network access. For instance, where the gateway device 12 is located in a corporate office the gateway device 12 may be in communication with one or more central servers to which all computers in the corporate office are connected. In the embodiment of FIG. 2, the management system 56 can be a property management system located within a hotel. Typical hotel property management systems automate operations such as room reservations, room assignments, guest check-in and check-out, and other front desk activities. Furthermore, typical hotel property management systems maintain a log of telephone calls and telephone charges for each guest room, and are in communication with the Internet to facilitate on-line reservation systems.

Where the management system 56 is illustrative of a property management system in a hotel, the gateway device 12 is in communication with the management system 56 such that each user/subscriber's access and connection to the hotel network via the gateway device 12 can be monitored by the management system 56. Typically, the gateway device 12 is connected via a serial connection 57, Ethernet connection, or LAN to the management system 56. According to one preferred embodiment the gateway device 12 is connected to the management system 56 via a serial interface. The connection may operate at a variety of baud rates, such as at 9,600 or 56,000 bits per second, or at much higher rates. The primary purpose for integrating the gateway device 12 with the management system 56 is to allow the hotel to bill each specific user/subscriber for their use and connection to the hotel's network or to automatically bill such use directly to the room from which access was obtained. As disclosed in detail in the Gateway Device Applications, the identity of a user or a location from which a user communicates with the network can be determined by the gateway device 12. According to one aspect of the invention, a user will not be authorized access to networks 20 or online serves 22 until the user is authorized access. This may require a user to enter a user name and ID to identify the user, or may require registration (e.g., input of a credit card number) or pre-payment for use of the system. Furthermore, the user may be authenticated based upon the AAA process described in U.S. patent Application titled "Systems And Methods For Providing Dynamic Network Authorization, Authentication And Accounting," inventors Joel Short and Florence Pagan, the contents of which are incorporated herein by reference. As described in the application, the gateway device 12 can identify users based upon the user's computer, location, or computer from which access is requested.

The gateway device 12 can thus monitor and record information such as the identity of the user, the room from which the user obtained access, the amount of time that the user utilized the network, the cost of each network access, the time, date and duration of the network access, and other additional information. Through this integration, systems of the present invention offer user/subscribers of computer networks integrated with management systems convenient payment plans in which users do not have to pre-pay for network access or physically pay each time the network is accessed, and features, such as billing status, that are otherwise available only by directly accessing management systems.

Traditional hotel property management systems are configured to communicate with various third party systems, such as point of sale systems, PBX systems, pay per view systems, and credit card authorization servers through serial ports, modem communications, dedicated connections, or through other well known communication means. Such connections allow the management system 56 to function as a fully integrated system, which allows customers to use a variety of hotel resources while automatically being billed for each transaction. Hotel property management systems are generally configured to receive such communications because these third party systems are typically used in the vast majority of hotels. To receive data from each of these third party systems, management systems typically include software for communicating with the third party systems based upon the data protocol and data structure implemented by the management system. The software allows data from third party systems to be received and reconfigured, if necessary, so that the data is in a format appropriate to be utilized by the management system. However, because typical management systems that are currently deployed are not designed to receive data from a gateway device 12, the gateway device 12 can be designed to interface with the management system 56 without requiring additional programming of the management system software.

For instance, it will be appreciated by those of skill in the art that the information passed from the gateway device 12 to the management system 56 can be configured, in most respects, identical to information received by the management system 56 from a private branch telephone system (PBX), which are commonly utilized in hotels. PBX systems allow room to room, local and long distance telephone calls to be made by guests, and are typically connected to hotel property management systems to facilitate billing of hotel guests based upon the room in which the call is made. Charges for calls can then be paid by the guest upon checkout, automatically billed to the guest's credit card or automatically billed to the guest with room charges. Although the gateway device 12 may be configured to communicate with the management system 56 in the same manner as PBX systems, it will be appreciated that this configuration is not required by the present invention. However, such a configuration is preferred such that the gateway device can be integrated in existing hotels with minimum or no impact on the configuration of preexisting management system equipment. Because the gateway device 12 can communicate with management systems by any means well known to those of skill in the art for transmitting network access and usage data to management systems, it will be appreciated that the device 12 can be configured in any manner that results in the least significant impact on management systems or on the user or administrator.

Therefore, in a preferred embodiment the gateway device 12 of the present invention formats data such that the data has the same data protocol and data structure as that of a third party service, such as a PBX, that the management system 56 is designed to receive. The management system 56 is adapted to communicate using different protocols specific to different types of devices or third party systems. Thus, the gateway device 12 can masquerade as a PBX or another third party system. The gateway device 12 creates a data record corresponding to an individual user/subscriber's use of the computer system, including the user/subscriber's location (room number), access charge, and additional information, as discussed above. The gateway device 12 formats the data record to fit the proper format required by the property management system vendor. The data is then transmitted to the management system 56 using low level protocol format. Typically, such formats are well known to those of skill in the art of management system design. According to one embodiment of the invention, the gateway device 12 can format the data as a call accounting record (CAR), illustrated in FIG. 3.

Figure 3:
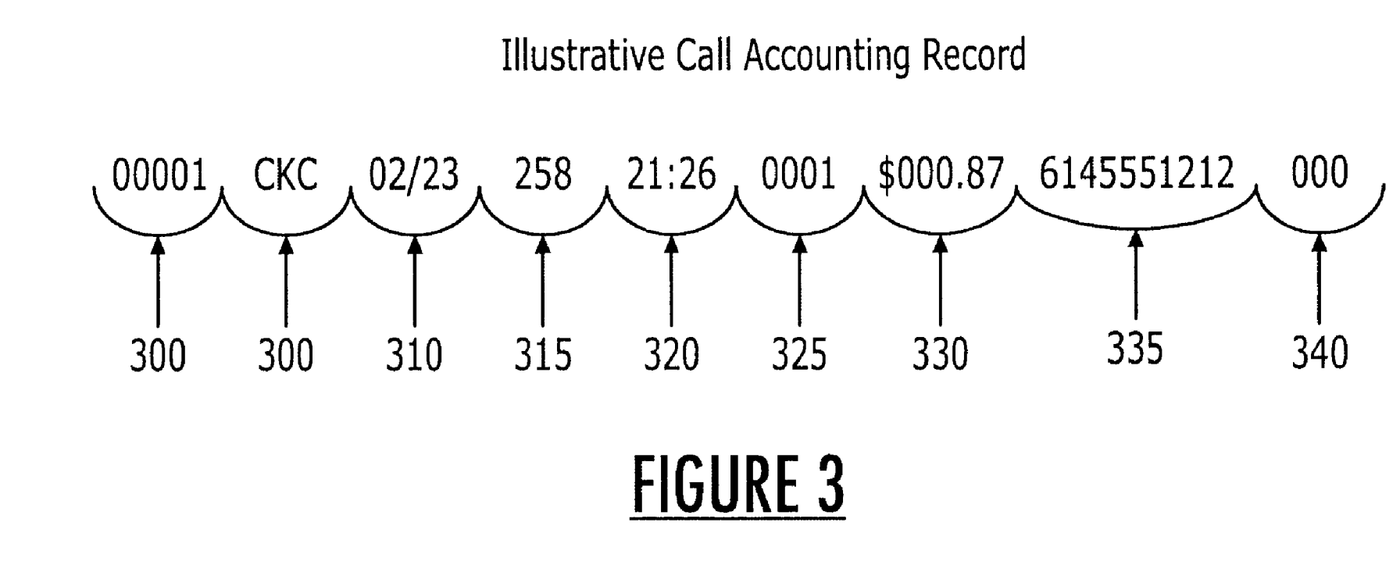
FIG. 3 shows a call accounting record generated by the gateway device, according to one embodiment of the present invention.

The CAR of FIG. 3 is in a standard PBX format that the gateway device 12 can modify as needed to conform to the format requested by the management system 56. The CAR includes data representative of month/day 310, extension/room 315, time 320, duration 325 (e.g., in minutes), charge 330, phone number 335, routing code 340, and the like, as well as additional data 300 that may be necessary for accurate ordering, transmittal and/or reception of the call accounting record. It will be appreciated that additional formats containing similar data can also be generated by the gateway device 12 for transmission to the management system 56. Because management systems can differ, each system utilizing different user interfaces, variables, and operating systems, the gateway device 12 should communicate data to the management system 56 using data formats acceptable to a large number of management systems. In this manner, the gateway device 12 may be compatible with a majority of property management systems. For example, the gateway device 12 may be compatible to operate with the most popular management systems and formats, such as Micros Fidelio (manufactured by MICROS Systems, Inc., Beltsville, Md.), HOBIC, Autoclerk (manufactured by AutoClerk, Inc., Lafayette, Calif.), and other well known systems and formats.

However, there are many different management system standards, none of which are universal and implemented in all property management systems. As a result, although the gateway device 12 can be configured to conform to a large number of differing management systems, the gateway device 12 is set up to communicate with the management system in which is integrated. Furthermore, it will be appreciated that although the gateway device 12 may include a number of configuration settings, the device may not be able to conform to some systems. As a result, a translator 53 may be optionally used to manipulate the data output by the gateway device 12 in such a manner as to allow the data to be utilized by the management system 56. In one embodiment, the translator may comprise a Lodging Link II device (LL) (manufactured by Protocol Technologies, Inc., Scottsdale, Ariz.) to convert incoming data from the gateway device 12 to data acceptable to the property management system device, such as UHALL protocol. Additionally, the translator 53 may also be connected to one or more devices or systems in =communication with the property management system, such as the pay per view system or credit card authorization system, to format data output by any system or component having data protocols which differ from those of the management system 56.

Additionally, according to one aspect of the invention, it should be appreciated that a gateway device 12 in located within a network may not have a relationship with a billing company, and as a result, the gateway device 12 may not obtain a CAR from a third party. In this instance, a management system 56 can rely on the gateway device 12 to create its own call accounting record that can be sent to a standard printer. The printed data (call accounting record generated by the gateway device 12) can then be manually entered into the management system accounting records, such as a hotel/business accounting record, and thus added to the user's bill.

Because data may be transferred to the management system in a CAR format, data typically within such format must be altered to accurately reflect the computer network service being provided to the user/subscriber. For example, in PBX systems, CAR format usually includes the phone number to which a telephone call is being made. However, when a user/subscriber is obtaining access to the hotel network via the gateway device 12, no telephone number is dialed or called. Therefore, when possible, data within the CAR format (i.e., telephone record), such as telephone numbers, may be replaced with a descriptive record that indicates some other data that the property management systems wishes to track or record. On the other hand, where the CAR records cannot be replaced, a mock field, such as a mock telephone number, may be included so that the property management system receives the entire record it is programmed to receive. Thereafter, the mock number is not utilized by the management system 56. Additional problems may also exist, for example, where the management system 56 is not devised to support the normumeric ASCII characters typically transmitted by the gateway device 12. In this situation, the gateway device can be configured to replace the ASCII characters with numeral designations.

Integrating the gateway device 12 with the management system 56 allows a user/subscriber's account to be billed directly to that user?s hotel bill in a like manner as telephone calls billed to a hotel room. For example, where the management system 56 receives data representing a user's access to the local system, from the gateway device 12 and as described in the Gateway Device Applications, the management system 56 can automatically bill the operator through the use of a credit card authorization system in communication with the management system 56. It will be appreciated that this can be accomplished because the property management system can register network access, identified by the gateway device, in one or more fields existing or established in the management system 56. For instance, the management system 56 can register network access as a long distance call, or can establish a special fee for such access and add the cost of that access to a customer's bill in the same manner as a long distance call. In this manner, the customer's payment can be fast, easy, automated and transparent to the user.

Additionally, once the data transmitted by the gateway device 12 is received by the management system 56, the management system 56 can display the data using a management system 56 interface. Preferably, the data may be displayed in a easily readable and printable form to allow a user/subscriber to view a summary of access information. Moreover, the data should be accessible to the user/subscriber's accounting record. In this manner, charges due to network access may be automatically placed on a customer's pre-existing bill, such as a hotel bill. Where access is obtained at another location, such as at an airport, the airport system manager (i.e., equivalent to the hotel property management system in the above example) may automatically bill the customer, can automatically charge the customer's credit card, or can add the charges to an account which the customer maintains. In this regard, while the management system has primarily been described in conjunction with a hotel computer network, the management system can be utilized in a variety of other applications in which a user/subscriber obtains access to a computer network or other on-line service via a gateway device.

Although the invention has been described herein as using a gateway device to monitor and facilitate network access of a user, and to transmit accounting information to the management system, it will be appreciated that the gateway device 12 can also be used to account for a variety of charges incurred as a result of the user's interaction with online services 22 or networks 20. For instance, a remote system can bill the user directly to the management system. This could occur, for instance, where the user orders goods or services online. In this event, the gateway device can add the charge directly to the user's account in the management system.

Additionally, although the management system has been discussed herein as receiving data from the gateway device, in a passive manner, the management system can additionally transmit information to the user or gateway device 12. Therefore, the management system can activate communication with the gateway device 12 to aid in managing the computer network. For instance the management system may inform the gateway device 12 that a particular room or user should be allowed or denied access to the system 50, or that a particular port should be turned on or off. Additionally, the management system may request information from the gateway device, such as whether or not a particular user is using the system. This request may be automated or facilitated by a network administrator. Therefore, it will be appreciated that the system 50 may operate both downstream (from the user/computer or network or online service to the management system) and upstream (from the management system to the user/computer or online service or network.)

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for integrating a gateway device with a management system to automatically bill a user for access to a computer network, comprising:

a computer;

a network gateway device in communication with said computer for connecting the computer to the computer network, wherein the network gateway device communicates with the computer absent additional agents implemented by the computer and wherein the network gateway device maintains data representative of the user's access to the computer network; and a management system connected to said network gateway device for automatically billing the user based upon usage of the computer network, wherein said management system is configured to communicate according to at least one predetermined protocol, wherein the network gateway device formats the data into call accounting record format, and wherein said management system receives the data formatted by the network gateway device and utilizes the data formatted by the network gateway device for billing purposes.

2. The system of claim 1, further comprising a translator in communication with the gateway device and management system for receiving the data reconfigured by the network gateway device, said translator adapted to further reconfigure the reconfigured data, and to transmit the further reconfigured data to the management system.

3. The system of claim 1, wherein the data representative of the user's access to the computer network comprises data representative of the user's location.

4. The system of claim 1, wherein said management system is a hotel property management system.

5. The system of claim 1, wherein the management system stores data reconfigured by the network gateway device, and wherein at least some of said data is accessible by the computer.

6. A method for integrating a gateway device with a management system to automatically bill a customer for access to a computer network, comprising:

enabling a user to access, via a network gateway device, a computer network absent additional agents implemented by a user's computer;

collecting data corresponding to the user's access to said computer network in said network gateway device;

reconfiguring said data into call accounting record format; and transmitting the reconfigured data to the management system.

7. The method of claim 6, further comprising providing a translator for reconfiguring said data and transmitting said reconfigured data to the management system.

8. The method of claim 6, wherein transmitting the reconfigured data to the management system includes transmitting the reconfigured data to a hotel property management system.

9. The method of claim 6, further comprising storing said reconfigured data at the management system, wherein at least some of said reconfigured data is accessible by said user.

10. A system for integrating a gateway device with a management billing system, wherein the billing system can activate communication with the gateway device, comprising:
   a computer;
   a network gateway device in communication with said computer for connecting the computer to the computer network, wherein the network gateway device communicates with the computer absent additional agents implemented by the computer and wherein the network gateway device maintains data representative of the user's physical location and the user's access to the computer network; and
   a management billing system connected to said network gateway device, wherein the management system receives the data representative of the user's access to the computer network, and wherein the management system initiates communication with the gateway device to control a user's access to the computer network and a physical location's access to the computer network.

11. The system of claim 10, wherein the management system communicates with the network gateway device in at least one predetermined protocol selected from the group consisting of a low level protocol, a call accounting record, and a private branch telephone system protocol.

12. The system of claim 10, wherein said management system is a hotel property management system.

13. A system for integrating a gateway device with a management system to automatically bill a user for access to a computer network, comprising:
   a computer;
   a network gateway device in communication with said computer for connecting the computer to the computer network, wherein the network gateway device communicates with the computer absent additional agents implemented by the computer and wherein the network gateway device maintains data representative of the user's physical location and usage of the computer network; and
   a management system connected to said network gateway device for automatically billing the user based upon the physical location of the user and the usage of the computer network, wherein said management system is configured to communicate according to at least one predetermined protocol,
   wherein the network gateway device formats the data to meet one of the predetermined protocols supported by said management system, and wherein said management system receives the data formatted by the network gateway device and utilizes the data formatted by the network gateway device, including the physical location of the user and the user's network usage, for billing purposes.

14. The system of claim 13, further comprising a translator in communication with the gateway device and management system for receiving the data reconfigured by the network gateway device, said translator adapted to further reconfigure the reconfigured data, and to transmit the further reconfigured data to the management system.

15. The system of claim 13, wherein the at least one predetermined protocol is selected from the group consisting of a low level protocol, a call accounting record, and a private branch telephone system protocol.

16. The system of claim 13, wherein said management system is a hotel property management system.

17. The system of claim 13, wherein the management system stores data reconfigured by the network gateway device, and wherein at least some of said data is accessible by the computer.

18. A method for integrating a gateway device with a management system to automatically bill a customer for access to a computer network, comprising:
   enabling a user to access, via a network gateway device, a computer network, absent additional agents implemented by a user's computer;
   collecting data corresponding to the user's access to said computer network, including a physical location of the user and the user's network usage, in said network gateway device;
   reconfiguring said data to one of the predetermined data formats which may be received by a management system; and
   transmitting the reconfigured data to the management system.

19. The method of claim 18, further comprising providing a translator for reconfiguring said data and transmitting said reconfigured data to the management system.

20. The method of claim 18, wherein reconfiguring said data comprises reconfiguring said data to one of said predetermined formats selected from the group consisting of a low level protocol, a call accounting record, and a private branch telephone system protocol.

21. The method of claim 18, wherein transmitting the reconfigured data to the management system includes transmitting the reconfigured data to a hotel property management system.

* * * * *